Oct. 16, 1951 H. M. LAMB 2,571,261
BRIDLE POWER SEALED CONNECTION
Filed Jan. 28, 1946 2 Sheets-Sheet 1
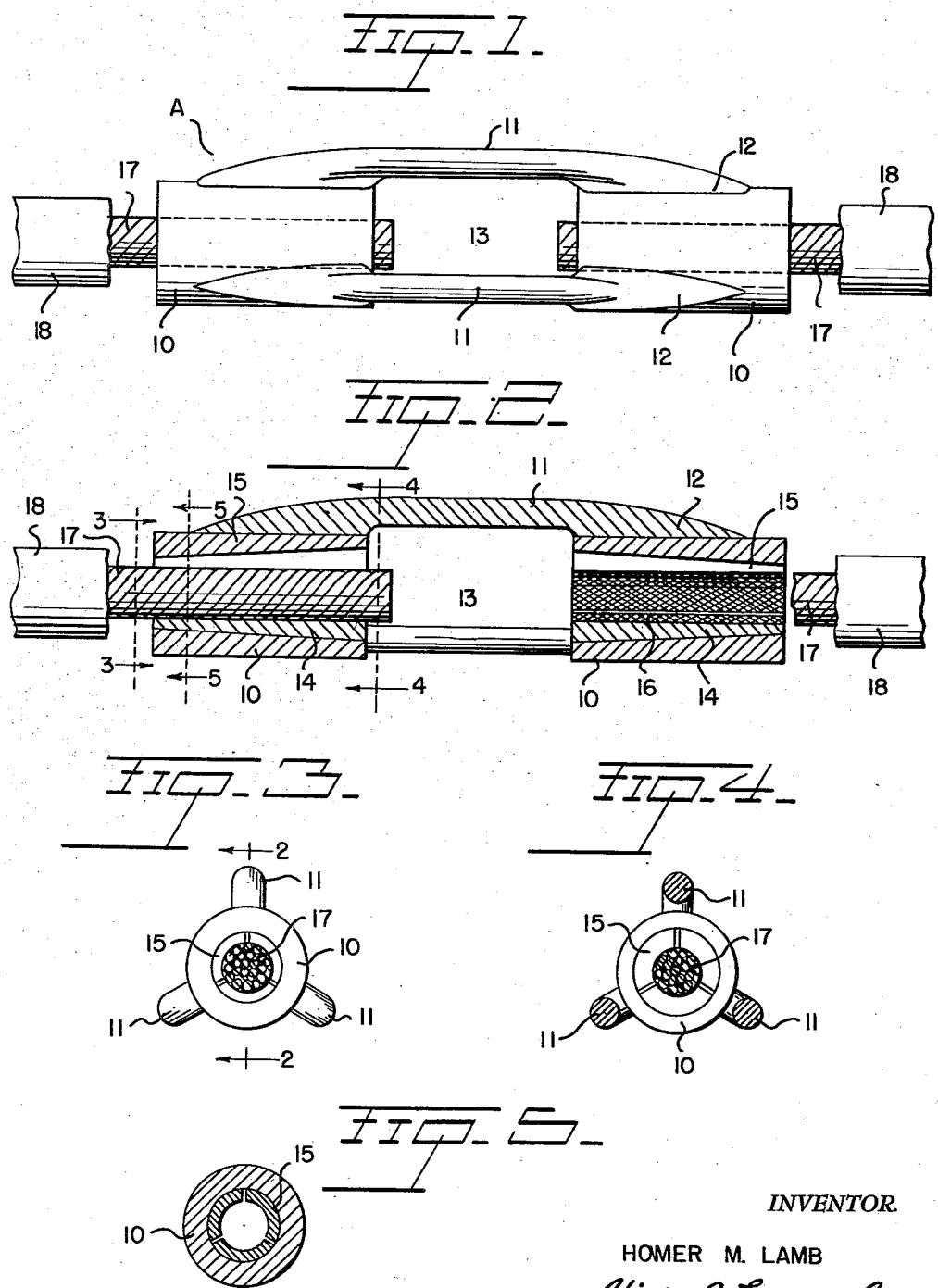
INVENTOR.
HOMER M. LAMB
BY Victor J. Evans & Co.
ATTORNEYS

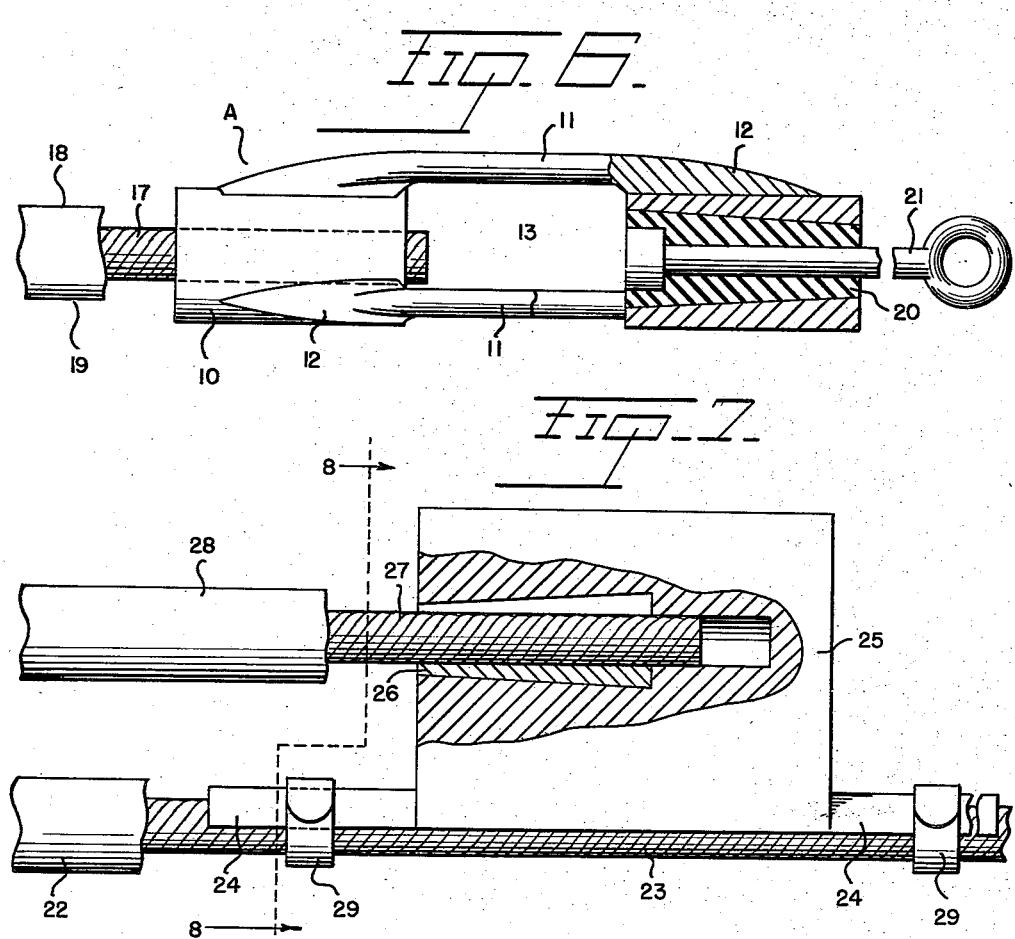

UNITED STATES PATENT OFFICE 2,571,261

BRIDLE POWER SEALED CONNECTION

Homer M. Lamb, Thompsonville, Ill.

Application January 28, 1946, Serial No. 643,878

1 Claim. (Cl. 287—76)

The invention relates to a cable connector, and more especially to a power line bridle connection.

The primary object of the invention is the provision of a connection of this character, wherein a bridle-power sealed connection is made connecting two or more feeder lines or cables or tension lines on high power or solid cables, the connection being novel in construction and unique in the assembly thereof.

Other objects of the invention are the provision of a connection of this character, for tapping feed lines to boost power on trolley lines that extend to other sections or territories, the provision of a connection the terminals of which are sealed and held firmly and the provision of a connection that can be installed with ease and dispatch.

A further object of the invention is the provision of a connection of this character, wherein slipping, erosion or the accumulation of dust, particularly in mines will be prevented, and the anchoring of the cables or lines is accomplished with surety.

A still further object of the invention is the provision of a connection of this character, which is simple in construction, thoroughly reliable and efficient in purpose, strong, durable, readily and easily installed, assuring safety, and inexpensive to manufacture and install.

With these and other objects in view the invention consists in the features of construction, combination and arrangement of parts as will be hereinafter more fully described, illustrated in the accompanying drawings, which disclose the preferred embodiments of the invention and pointed out in the claim hereunto appended.

In the accompanying drawings:

Figure 1 is a side elevation of the bridle connection constructed in accordance with the invention;

Figure 2 is a vertical longitudinal sectional view therethrough;

Figure 3 is a sectional view taken on the line 3—3 of Figure 1 looking in the direction of the arrows;

Figure 4 is a sectional view taken on the line 4—4 of Figure 1 looking in the direction of the arrows;

Figure 5 is a sectional view taken on the line 5—5 of Figure 1 looking in the direction of the arrows;

Figure 6 is a view similar to Figure 1 partly in section showing a slight modification;

Figure 7 is a view similar to Figure 6 showing a further modification;

Figure 8 is a sectional view taken on the line 8—8 of Figure 7 looking in the direction of the arrows.

Similar reference characters indicate corresponding parts throughout the several views in the drawings.

Referring to the drawings in detail, particularly Figures 1 to 5 inclusive, the connection constituting the present invention, comprises a bridle member designated generally at A in its entirety, involving a pair of spaced tubiform terminal portions 10, which are in axial alignment with each other and united in their spaced relation to each other by slight outwardly arched coupling webs 11, which are disposed uniformly spaced concentrically about the portions 10, with outwardly tapered areas 12 merging into such terminals, and the spacing of these portions create therebetween a vacancy 13.

The terminal portions 10 are formed with outwardly tapered bores 14, which are reversed to each other in said portions for accommodating plural longitudinally split wedging sleeve-like keys 15, these being externally tapered correspondingly to the bores 14, while having internal straight central passages 16 therethrough, into which are received the stripped ends 17 of covered insulated cables 18, as best seen in Figures 1 and 2 of the drawings, and thus creating a bridle-power sealed connection between two feeder tension lines, yet it may be used for other purposes, for instance, tension lines on high power or solid cables not shown.

Sufficient keys 15 are used to make a complete encirclement of the cable inside of the terminal portion 10 of the bridle connection. In the present invention three keys are sufficient to make a complete encirclement of the cable but in some instances the keys may be reduced in size so that more keys are required. Each key is to be slipped over its cable end 17 after the latter has been passed into the portion 10 of the bridle and when all the keys have been inserted in the portion 10, with a pull on the cables 18 and a concurrent tap with a hammer or other like implement on the keys 15 the latter will become firmly embedded in the bridle and the cables will be ready to be drawn taut for the stringing thereof.

In Figure 6 of the drawings there is shown a slight modification of the invention, wherein only one cable 19 is gripped, while opposite thereto the key 20 is of insulated material, and has swiveled therein longitudinally of the same an eye anchoring member 21.

In Figures 7 and 8 of the drawings there is shown a further modification of the invention, wherein the cable 22 has a cleared insulating area 23 on which is superimposed a saddling crown 24, with an intermediate block like head 25, having parallel with the area 23 wedging keys 26 accommodating the end 27 of tapped in feed line 28, the crown being made from copper and similarly the said block. The crown 24 at opposite ends beyond the block 25 is wrapped with elastic tape 29 so as to preferably prevent slipping, erosion or other accumulation of dust, particularly in mines or the like. The crown is preferably flexible.

The ends 17 of the cables may be wrapped with fine copper wire, if desired, and soldered to prevent fraying the wiring being not shown.

What is claimed is:

In combination, a first cable, a flexible saddling crown having an arcuate seat for receiving lengthwise said cable, removable adhesive means anchoring said crown to said cable, a block extending transversely from said crown, a frusto-conical bore in said block, a second cable having the terminal thereof in said bore, a plurality of tapered wedge members in said bore slidably engaging the walls thereof and circumferentially spaced about said second cable terminal frictionally embracing the same, whereby relative movement or any tendency thereto to separate said block and said second cable terminal relatively to each other will cause said tapered wedges to firmly grip said second cable.

HOMER M. LAMB.

REFERENCES CITED

The following references are of record in the file of this patent:

UNITED STATES PATENTS

| Number | Name | Date |
|---|---|---|
| 474,584 | Tobey | May 10, 1892 |
| 870,471 | Schnaufer et al. | Nov. 5, 1907 |
| 1,258,580 | Lassiter | Mar. 5, 1918 |
| 1,642,345 | Telford | Sept. 13, 1927 |
| 1,876,663 | Graves et al. | Sept. 13, 1932 |
| 1,899,531 | Seifner | Feb. 28, 1933 |
| 1,932,010 | Becker | Oct. 24, 1933 |
| 1,945,575 | Sumpter | Feb. 6, 1934 |
| 2,060,864 | Hedler | Nov. 17, 1936 |
| 2,180,866 | Cryer | Nov. 21, 1939 |
| 2,414,498 | Warner et al. | Jan. 21, 1947 |
| 2,463,144 | Buchanan | Mar. 1, 1949 |

FOREIGN PATENTS

| Number | Country | Date |
|---|---|---|
| 382,564 | Germany | Oct. 4, 1923 |
| 114,360 | Switzerland | Aug. 2, 1926 |